United States Patent
Phelps et al.

[15] 3,654,518
[45] Apr. 4, 1972

[54] FAST ACTING SOLID STATE CIRCUIT BREAKER

[72] Inventors: Weldon L. Phelps, Dunlap; Kerwyn B. Smith, Decatur, both of Ill.

[73] Assignee: Caterpillar Tractor Co., Peoria, Ill.

[22] Filed: Sept. 17, 1970

[21] Appl. No.: 73,098

[52] U.S. Cl. ...................................317/33 R, 317/54, 323/9
[51] Int. Cl. ............................................................H02h 3/08
[58] Field of Search..........................317/22, 33 R, 33 VR, 54; 323/9

[56] References Cited

UNITED STATES PATENTS

| | | | |
|---|---|---|---|
| 3,558,988 | 1/1971 | Ellenberger | 317/33 R |
| 3,317,817 | 5/1967 | Gershen | 323/9 X |
| 3,100,863 | 8/1963 | McCullough | 317/33 VR |
| 3,131,344 | 4/1964 | Rosenfeld et al. | 323/9 X |
| 3,405,319 | 10/1968 | Barringer | 317/33 VR |
| 3,432,726 | 3/1969 | Meyer et al. | 323/9 X |

Primary Examiner—A. D. Pellinen
Attorney—Fryer, Tjensvold, Feix, Phillips & Lempio

[57] ABSTRACT

A circuit breaker includes a voltage sensing resistor and a transistor for transmitting current from a DC power source to a load. Conduction through the transistor is controlled by additional solid state circuit elements which respond to an increased voltage drop across the resistor by stopping conduction through the transistor with a regenerative feedback action whereby the current from the source to the load is cut off abruptly in response to an increase of the load current above a predetermined level. The circuit breaker has no moving contacts or the like and resets automatically when the circuit from the power supply to the load is opened by switch means or the like. The circuit breaker dissipates very little power in either the open or closed condition and the components may be included with the load circuit itself whereby the circuit breaker cannot readily by bypassed by a jumper connection or the like.

2 Claims, 1 Drawing Figure

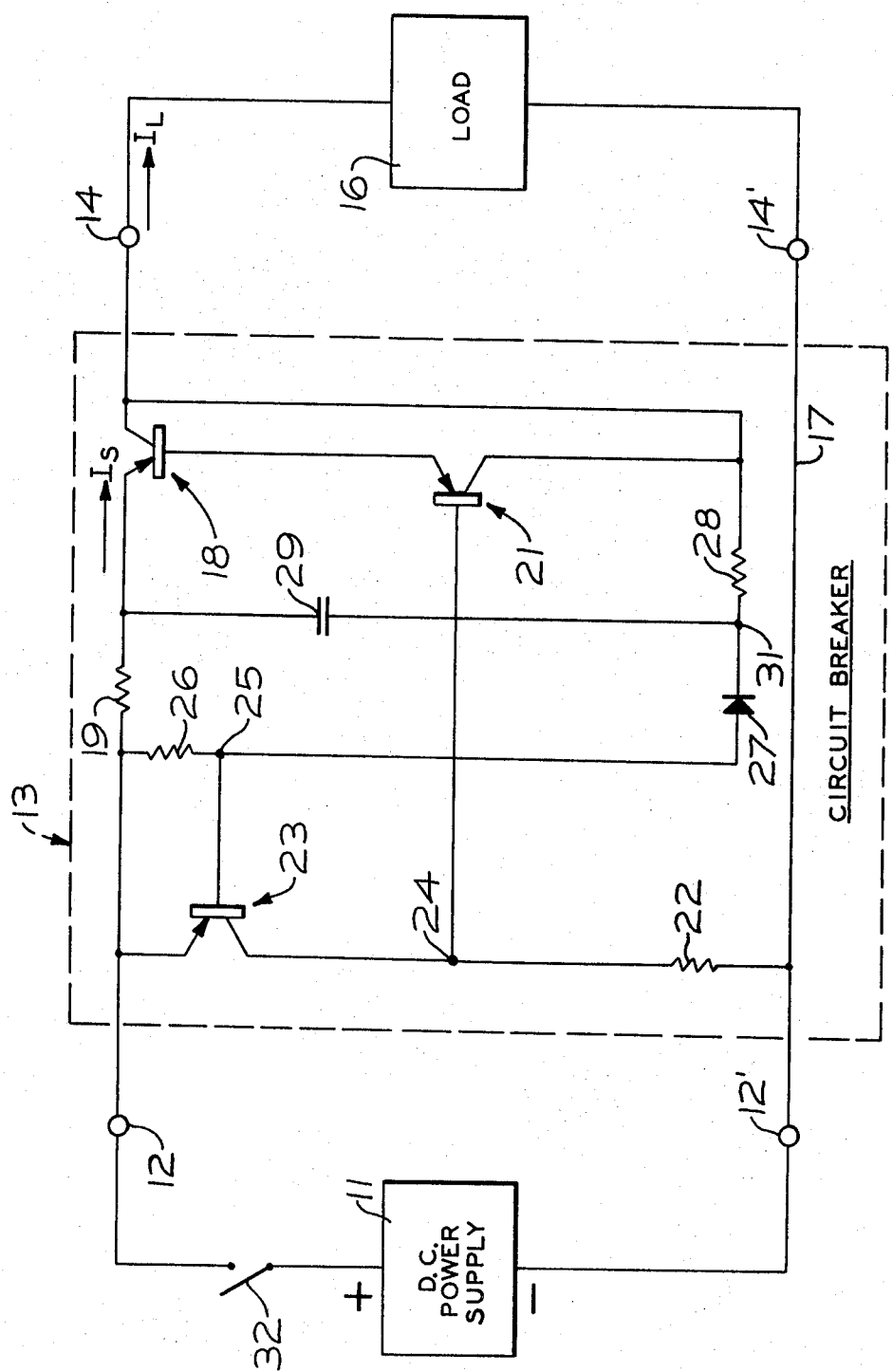
INVENTORS
WELDON L. PHELPS
KERWYN B. SMITH
ATTORNEYS 3,654,518

FAST ACTING SOLID STATE CIRCUIT BREAKER

BACKGROUND OF THE INVENTION

This invention relates to the protection of electrical circuits against excessive current flow and more particularly to a fast acting solid state circuit breaker for use in direct current circuits.

Many forms of electrical equipment can be damaged or create safety hazards if conditions arise which result in a greater current flow than that called for by the design of the equipment. Overcurrent conditions may result from various causes such as a short circuit, accidental grounding of a terminal, stalling of a motor or various other circumstances well known to those skilled in the art. To protect against overcurrents, it is customary to provide some means for interrupting the electrical power flow in response to a rise of current above a predetermined level.

Devices which have customarily been used for this purpose include fuses, which consist of primarily a current conductor that melts to open a circuit carrying an excess current, and electromechanical circuit breakers having movable contacts which are opened by an armature in response to the magnetic flux increase produced by a heavy current in a coil. Both fuses and electromechanical circuit breakers are subject to several serious disadvantages. Both are slow acting with the result that serious damage may occur from excess current before the circuit is opened. Considerable time is required to melt a fusable element. In electromechanical circuit breakers, the effects of inertia and inductance delay opening of the circuit. Both devices are readily rendered inoperative by being shunted with a jumper connection. Many people will attempt to correct an electrical malfunction by providing a connection bypassing the fuse or circuit breaker rather than correcting the fundamental problem which causes the fault. The safety hazards and equipment damage which can result from this practice are well known. Conventional circuit interrupters may also be difficult to reset, particularly in the case of fuses which must be removed and replaced.

Certain of the problems discussed above can be alleviated by utilizing electronic means to open a circuit in the presence of an overcurrent. As heretofore constructed, such means have been undesirably complex and costly without necessarily providing the desired extremely fast response to an overcurrent condition.

SUMMARY OF THE INVENTION

The present invention is a simple and highly reliable solid state circuit for interrupting power flow from a direct current power source to a load in response to an overcurrent, the opening of the circuit being extremely fast. Current from the power supply is transmitted to the load through a small sensing resistor and the emitter collector circuit of a primary transistor. Base current of the primary transistor is controlled by additional transistors and circuit elements connected across the sensing resistor which provide a regenerative feedback action to cut off conduction through the primary transistor in response to an increasing voltage drop across the sensing resistor. The circuit may be reset by momentarily opening and closing the connection to the power supply and may be physically included within the load circuit wherein it cannot readily be bypassed by careless personnel. Power consumption in either the open or closed condition is relatively small so that heat sink requirements are minimal and low cost components may be utilized.

Accordingly, it is an object of this invention to provide a simple, inexpensive, highly reliable and fast acting solid state circuit breaker for a direct current system.

The invention together with further objects and advantages thereof will best be understood by reference to the following description of a preferred embodiment in conjunction with the accompanying drawing.

BRIEF DESCRIPTION OF THE DRAWING

The accompanying drawing is a schematic circuit diagram illustrating a preferred arrangement of circuit elements for providing a circuit breaker in accordance with the invention.

DESCRIPTION OF A PREFERRED EMBODIMENT

Referring now to the drawing, there is shown a DC power supply 11 having positive and negative output terminals 12 and 12' respectively which connect through the circuit breaker 13 with terminals 14 and 14' of an electrical load 16. Circuit breaker 13 was originally designed for use on a motorized truck wherein the power supply 11 is the vehicle battery and the load 16 is a backup alarm horn and control circuit therefor as described in U.S. Pat. No. 3,514,622. In a backup alarm circuit of this form, it was found that short circuits in the horn or accidental grounding of certain terminals could cause severe damage to the associated control circuit and that convention fuses and electromechanical circuit breakers were too slow acting to provide reliable protection. The backup alarm circuit discussed above is referred to as one specific example of usage of the present invention but it will be apparent that the circuit breaker has application to diverse other electrical circuits where similar problems may be encountered.

Circuit breaker 13 has a conductor 17 providing a direct connection between negative terminal 12' of the power supply 11 and negative terminal 14' of the load 16, and it should be noted that negative terminals 12' and 14' together with conductor 17 may be all defined by a common ground connection if desired. To transmit current from positive terminal 12 of the power supply to input terminal 14 of load 16, circuit breaker 13 has a first transistor 18 with the emitter thereof being connected to power supply terminal 12 through a small sensing resistor 19. The collector of transistor 18 is connected to positive terminal 14 of load 16. Accordingly, current from power supply 11 is transmitted to load 16, as indicated by arrow $I_L$, when transistor 18 is in the conductive state.

To maintain the first transistor 18 conductive under normal operating conditions, the base thereof is connected to the emitter of a second transistor 21 and the collectors of both transistors 18 and 21 are connected together. Transistors 18 and 21 thus constitute a composite transistor circuit responsive to input voltage applied to the base of second transistor 21. To provide negative bias, the base of second transistor 21 is connected to negative conductor 17 through a resistor 22. Accordingly, under normal operating conditions, transistor 21 is conductive and saturated and maintains first transistor 18 in a similar condition. The load current $I_L$ flows through sensing resistor 19 and the emitter-collector circuit of transistor 18. The current $I_S$ through the sensing resistor 19 is similar to the current $I_L$ through load 16 aside from the base current through transistor 18. Considering now the means for interrupting the load current $I_L$ if the current rises above a predetermined level, a third transistor 23 has an emitter connected to positive power supply terminal 12 and a collector connected to the base of transistor 21 and to negative conductor 17 through resistor 22. Thus, a junction point 24 between the collector of transistor 23 and resistor 22 is connected to the base of transistor 21 and effectively the voltage at the junction controls the composite transistor defined by transistors 18 and 21.

The base of transistor 23 is connected to positive power supply terminal 12 through a junction point 25 and an additional resistor 26 and is connected to positive load terminal 14 and additional resistors 27 and 28, the resistor 27 being constituted by a diode in this particular example. The conducting path defined by resistor 26, diode 27 and resistor 28 is thus in parallel with the path defined by sensing resistor 19 and transistors 18 and 21 and determines the base voltage of transistor 23. The resistor values are chosen to bias transistor 23 to cutoff under normal load current conditions. To bypass transient voltage spikes, a capacitor 29 may be connected between the emitter of transistor 18 and the junction point 31 between diode 27 and resistor 28.

Considering now the action of the circuit breaker 13 in the presence of an increase of load current $I_L$ resulting from a short circuit or other malfunction, such current increase results from a decrease of resistance or reactance in the load circuit and is accompanied by an increase in the voltage drop across sensing resistor 19. When the voltage drop across the circuit comprised of the sensing resistor 19, the emitter to base circuit of transistor 18 and the emitter to collector circuit of transistor 21 rises, base current starts to flow at transistor 23 to cause transistor 23 to begin to conduct. As the collector current in transistor 23 increases, the voltage across resistor 22 increases accordingly causing the voltage at junction point 24 to rise. The rise of voltage at junction 24 decreases the base current from transistor 21 which then begins to turn off. As transistor 21 begins to become non-conductive, base current from transistor 18 is in turn decreased and thus the transistor 18 also begins to become non-conductive.

With the decreasing conduction through both transistors 18 and 21, the voltage drop thereacross becomes still greater and the base current from transistor 23 increases further driving the transistor 23 toward the saturated state. The accompanying rise of voltage at the base of transistor 21 is thereby accelerated and thus the transistors 18, 21 and 23 exhibit a regenerative feedback action which very abruptly renders the primary transistor 18 non-conductive. Load current decreases in an exponential manner with an immediate partial decrease at the instant an overcurrent condition occurs. While series connected resistors 26, 27 and 28 continue to provide a current path between terminals 12 and 14, the total resistance in this particular current path may be made very high so that the current flow during the open condition of the circuit breaker is too small to be of any practical consequence.

In one example of a circuit breaker as described above wherein the normal load current was five amperes in a 24 volt system, interruption of power to the load occurs in 0.002 seconds after an undesired increase of current.

Circuit breaker 13 resets automatically upon a monentary interruption of supply voltage to terminals 12, for example, by opening of a switch 32 between the power supply 11 and terminals 12. As the circuit breaker 13 requires only a small number of circuit elements and no moving contacts, coils or the like, the components may readily be intermixed with components of the load circuit and embedded in plastic therewith if desired, so that it is difficult or impossible for an operator to bypass the circuit breaker by providing a jumper connection between terminals 12 and 14.

What is claimed is:

1. Means for interrupting the electrical current between a direct current source and a load when said current exceeds a predetermined value wherein said current interruption is accomplished wholly at solid state devices and without requiring the mechanical movement of elements, said source and said load each having positive and negative terminals, comprising:
    a sensing resistor connected between similar terminals of said source and said load,
    conductive means connecting the other terminals of said source and said load,
    a first transistor having an emitter collector circuit connected between said similar terminals of said source and said load in series relationship with said sensing resistor, said emitter collector circuit of said first transistor in series with said sensing resistor being the single current path between said similar terminals of said source and said load that is capable of transmitting significant operating current to said load whereby all significant current flow to said load is directly blocked by said first transistor at said emitter collector circuit thereof when said first transistor is made non-conductive, said first transistor having a base for controlling conduction through said emitter-collector circuit thereof,
    a second transistor having an emitter collector circuit connected between said first transistor base and said similar terminal of said load, said second transistor having a base for controlling conduction through said emitter-collector circuit thereof,
    a third transistor having an emitter-collector circuit connected between said similar terminal of said source and said second transistor base, said third transistor having a base for controlling conduction through said emitter-collector circuit thereof,
    a second resistor connected between said second transistor base and said other terminal of said source whereby a voltage rise is produced at said second transistor base when said third transistor becomes conductive,
    a pair of additional resistors series connected between said similar terminals of said source and said load, said pair of additional resistors having a circuit junction therebetween and
    conductive means connecting said third transistor base with said junction between said additional resistors to provide a voltage at said third transistor base which holds said third transistor non-conductive until said current exceeds said predetermined value, the increased voltage drop across said additional resistors accompanying said increase of current to said load above said predetermined value acting to turn said third transistor conductive and thereby turn said second transistor and said first transistor non-conductive with a regenerative feedback action.

2. The combination defined in claim 1 further comprising switch means for temporarily interrupting the electrical connection between said source and one of said terminals thereof to reset said means for interrupting the electrical current path.

* * * * *